United States Patent

[11] 3,624,280

[72] Inventor George E. Anderson
Indianapolis, Ind.
[21] Appl. No. 852,686
[22] Filed Aug. 25, 1969
[45] Patented Nov. 30, 1971
[73] Assignee RCA Corporation

[54] TELEVISION AMPLIFIER CIRCUITS

8 Claims, 1 Drawing Fig.

[52] U.S. Cl. .......... 178/5.4 R, 330/25, 330/30
[51] Int. Cl. .......... H04n 9/02
[50] Field of Search .......... 178/5.4 R; 330/30, 32, 25

[56] References Cited

UNITED STATES PATENTS

| | | | |
|---|---|---|---|
| 3,107,307 | 10/1963 | Sheffet | 330/30 |
| 3,188,492 | 6/1965 | Bymers | 330/25 |
| 3,255,419 | 6/1966 | Knapton et al. | 330/30 |
| 3,328,519 | 6/1967 | Willis | 178/5.4 |
| 3,430,068 | 2/1969 | McTaggart | 330/30 |
| 3,461,392 | 8/1969 | Webb | 330/30 |

OTHER REFERENCES

Towers " Transistor Television Receivers" John F. Rider Publisher Inc. P. 65

*Primary Examiner*—Richard Murray
*Assistant Examiner*—P. M. Pecori
*Attorney*—Eugene M. Whitacre

ABSTRACT: Luminance and chrominance common emitter amplifiers are driven by an emitter follower stage having an input direct coupled to a video detector.

The common emitter stages serve to isolate the chrominance signal components from the luminance components and permit the detector to operate relatively unloaded while being terminated in a primarily resistive impedance.

The chrominance amplifier includes substantially different magnitude impedances in the collector and emitter circuits to attenuate luminance signal components while amplifying chrominance signals as applied to the chrominance channel.

The luminance amplifier includes a collector load impedance for terminating a luminance delay line and an emitter impedance selected for peaking the luminance components, while further providing a low-impedance drive to sync and A.G.C. circuits included in the receiver.

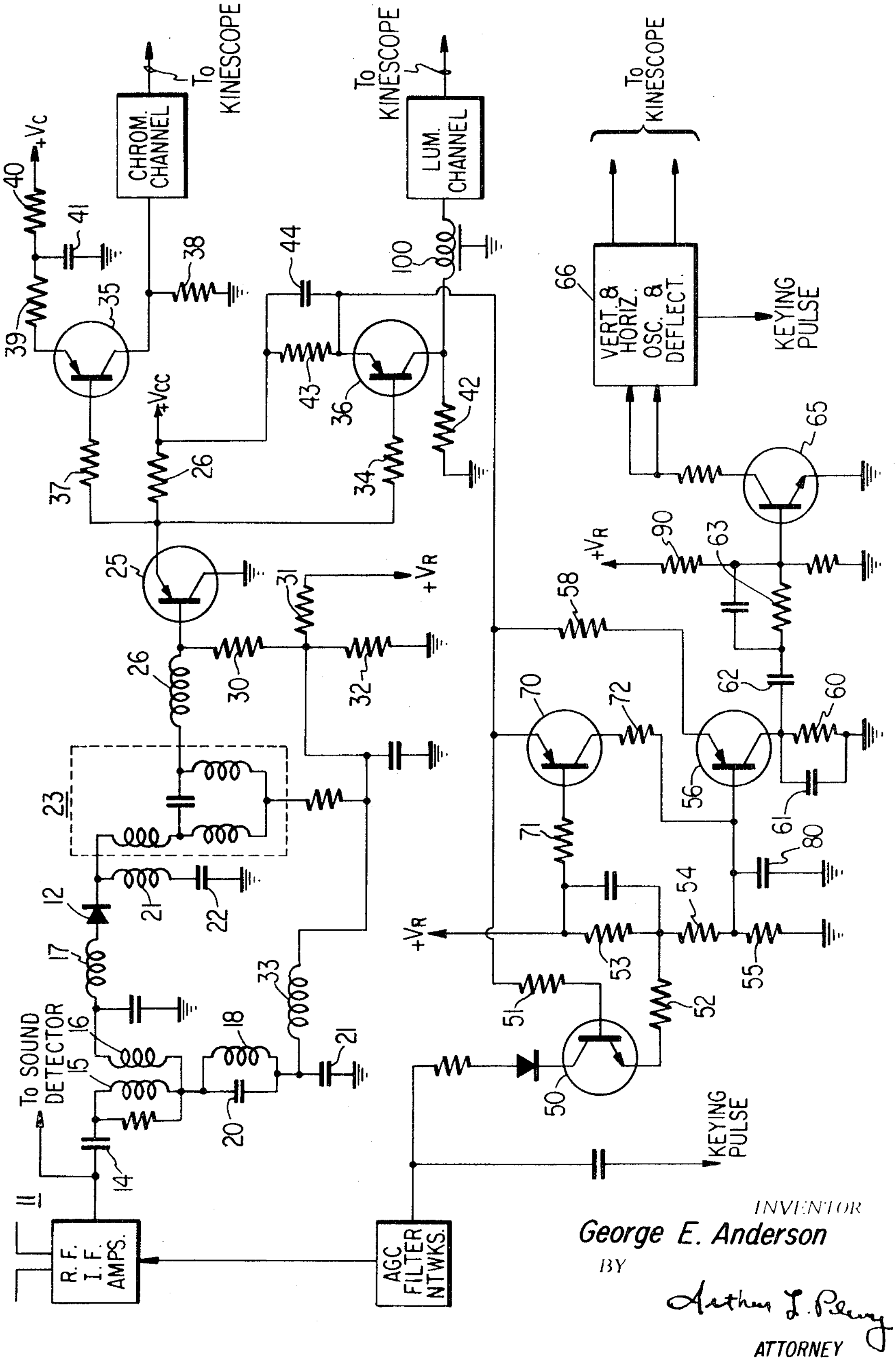
INVENTOR
George E. Anderson
BY
Arthur L. Plevy
ATTORNEY

TELEVISION AMPLIFIER CIRCUITS

This invention relates to television receivers and more particularly to a composite signal amplifier for use therein.

In a color receiver, the output terminal of the video detector for providing a composite signal is coupled to a chrominance processing channel, a luminance processing channel and sync, A.G.C. and deflection circuits.

It is desirable to isolate the respective channels from one another to prevent impedance reflections or cross-coupling of signals back and forth between channels. Such cross-couplings tend to disturb the requisite processing functions of the respective channels and can cause spurious products to appear in the final display.

Furthermore, operating requirements dictate that the video detector be properly terminated to provide a relatively constant drive impedance to the final intermediate frequency amplifier.

The video detector includes several traps and filters to discriminate against harmonics of the IF signals and to further filter spurious demodulation byproducts. If the detector and associated networks are not terminated properly there is a tendency for the detector in conjunction with the subsequent video amplifier to oscillate, thus further disturbing the final display.

Since the chrominance subcarrier components are present at the higher frequency end of the composite signal frequency range, suitable tuned networks are provided in the chrominance channel to respond to these components. These networks are usually relatively high Q parallel tank circuits to provide the required gain and the bandwidth necessary to selectively retrieve the chrominance subcarrier signal components. Tuned circuits are relatively expensive and require pretuning to obtain the proper gain-bandpass characteristic resulting in extra production and setup time. In any event, it would be desirable to obtain chroma selectivity prior to application of the composite signal to the chrominance band-pass amplifiers while providing gain for the chrominance frequencies and attenuation to the luminance frequencies.

It is also necessary to properly terminate the delay line in the luminance channel to prevent reflections from disturbing the luminance signals as applied to the kinescope, while further providing the correct signal phase for driving the kinescope. Since a convenient takeoff point for the sync and A.G.C. circuits is usually provided from the luminance channel, isolation of such circuits from the delay line drive is also desirable.

It is therefore an object of the present invention to provide an improved composite signal amplifier for use in a television receiver.

A further object is to provide an improved composite signal amplifier for properly terminating the video detector while isolating the chrominance and luminance channels.

Another object is to provide a composite signal amplifier for providing gain to the chrominance signals and attenuation of the luminance signals as applied to the chrominance channel.

These and other objects are provided by terminating the video detector included in a television receiver with an emitter follower having an emitter electrode respectively coupled through first and second resistors to the base electrodes of first and second common emitter amplifiers. The first amplifier has an emitter load for driving the sync and A.G.C. circuits of the receiver and a collector load including an impedance selected to terminate a luminance delay line while providing proper polarity signal for driving the kinescope. The second amplifier has a collector load impedance of a substantially smaller resistive magnitude than the emitter load impedance. The second amplifier serves to attenuate image brightness signal components at the collector output because of the selected impedance magnitudes. The emitter electrode of the second transistor is bypassed for chrominance signal frequencies to enable substantial gain at the collector for such frequencies compared to the attenuated brightness components thereat.

These and other objects will become clearer if reference is made to the following specification taken in conjunction with the accompanying drawing which is a partial schematic diagram of color television receiver circuitry according to this invention.

The FIGURE illustrates the usual head end structure of a television receiver including the RF amplifier converter and IF amplifier designated generally by the block 11. Conventionally the output of the final IF stage is coupled to a sound detector, not shown, and to the pix or video detector represented in part by diode 12. Coupling between the IF stage and the video detector includes the capacitor 14 which is coupled to the anode of the diode 12 through the series inductances 15, 16, and 17. The inductances including the trap, represented by inductor 18 in parallel with capacitor 20 and AC coupled to ground via capacitor 21, are provided to discriminate against harmonics and to further discriminate against intercarrier beat which would otherwise interfere with the detected video signal and provide consequent disturbances on the face of the kinescope display. Such filtering techniques and functions of the various components associated with the detector are well known in the prior art and not considered to be part of this invention.

Basically the output of the video detector, as represented by the cathode of the video detector diode 12, provides a detected composite signal across the series combination of inductor 21 and capacitor 22 connected between the cathode of the detector diode 12 and a point of reference potential such as ground. The cathode of the diode 12 is coupled through a filter network generally designated by numeral 23 which aids in preventing the 4.5 MHz demodulated product representative of the intercarrier sound signal, from appearing at the input or base electrode of an emitter follower transistor 25. Transistor 25 offers a high input impedance to the video detector to avoid loading of the detector and loading of the relatively high Q filter networks coupled to the output of the detector. The emitter follower 25 serves to isolate the capacitive reactances of the luminance and/or chrominance channels which capacitance effects might otherwise cause oscillations. The use of an emitter follower configuration, as shown, for transistor 25 further provides power gain and a low output impedance in order to optimumly drive the succeeding chrominance and luminance amplifiers coupled to the emitter electrode thereof. Furthermore, because of the impedance transfer offered by the emitter follower, the loading on the IF amplifier is predominantly determined by resistor 30. The emitter of transistor 25 is coupled to a point of reference potential labeled as $+V_{cc}$ via the resistor 26. The collector of transistor 25 is coupled to the point of reference potential.

The base electrode of transistor 25 is coupled to the output of the video detector and the subsequent filtering network via the inductor 26. A biasing network for the base electrode of transistor 25 is derived via a voltage divider including resistors 30, 31, and 32. Resistors 30 and 31 are connected in series between the base electrode of transistor 25 and a reference voltage source designated as $+V_R$. A prebias also provided for the detector circuit emanating from the same $+V_R$ reference supply via resistor 31, and resistor 32. Resistor 32 is coupled between the junction of resistors 30 and 31 and the point of reference potential. The diode 12 is biased at approximately zero volts by coupling the junction between resistors 31 and 32 to the cathode of the video detector diode 12 via the DC resistance of inductor 33. The DC path is thus provided through inductor 33, through inductor 18 and thence through inductors 16 and 17 to the anode of diode 12.

In this manner, the video detector as biased enables linearity in the operation of the diode device 12 and further improves the peak to peak output signal capable of being provided at the cathode of the video detector diode 12. For the absence of the video signal the base electrode of transistor 25 has a positive bias thereon as does the anode electrode of the video detector 12. The voltage divider so provided by the resistors 31 and 32 maintains transistor 25 at a positive bias and hence the output of the video detector at a positive bias. The input of the video detector or anode electrode of diode 12 is at approximately the same or a slightly less positive bias thereby rendering the diode 12 at a zero or slightly forward biased for the absence of video signals. Transistor 25, as biased by the voltage divider from the $+V_R$ reference source has a more positive voltage on the emitter electrode thereof, which differs from the voltage on the base by the normal $V_{BE}$ drop or by the normal voltage drop from base to emitter of the transistor 25. The emitter electrode of transistor 25 is respectively coupled to a chrominance amplifier transistor 35 and a luminance amplifier transistor 36 via the individual base isolating resistor 37 and 34 coupled between the emitter electrode of transistor 25 and the respective base electrodes 35 and 36. The collector electrode of the PNP-transistor 35 is coupled to ground through a load resistor 38. The emitter electrode of transistor 35 is coupled to a source of operating potential $+V_c$ via resistors 39 and 40 connected between the emitter electrode of transistor 35 and the operating bias source. A capacitor 41 is coupled between the junction of resistors 39 and 40 to provide bypassing of the emitter resistance 40 for chrominance signals. The amplifier including transistor 35 is arranged in a common emitter configuration and has the collector electrode coupled to the chrominance channel for amplification and separation of the chrominance subcarrier signals from the composite video signal.

The amplifier configuration shown is particularly advantageous as a composite signal amplifier used in the chrominance channel of a color receiver for reasons as follows: Desirably, the signal in the chrominance channel should be relatively free of the lower frequency luminance components in order to perform proper chrominance demodulation and processing.

In the amplifier shown, the magnitude of the series emitter resistors 39 and 40 are selected to be larger than the magnitude of the collector resistor 38. In order to obtain a relatively large voltage swing at the collector, the $+V_c$ source is selected to be much larger, for example, then the $+V_{cc}$ supply. In a typical example, the resistor 39 is 33 ohms, the resistor 40 is 33,000 ohms, while the collector resistor 38 is 4,700 ohms. Capacitor 41 is selected to exhibit a relatively low reactance towards the high frequency end of the composite signal range.

In this manner, the DC gain of amplifier 35 is low due to the selection of the collector and emitter impedances as is the relative AC luminance signal gain at the collector electrode of transistor 35. Due to the addition of the large emitter impedance in combination with the base resistor 37, transistor 35 operates at a relatively constant current drive. Furthermore, transistor 35 may be a relatively low voltage rated device even though the $+V_c$ supply may exceed 100 volts. This is so as the transistor 35 is always conducting due to the biasing thereof and will always exhibit a low voltage drop between collector and emitter due to the magnitude of resistors 39 and 40.

Accordingly, the chrominance amplifier, serves to provide a high AC gain for chrominance signals, while providing a low gain to luminance signals. The transistor 35 further serves to isolate the chrominance channel and the associated controls from the luminance channel and hence chrominance signal processing or chrominance control variations will not disturb the phase or amplitude of the luminance channel signal by reflecting back into the luminance signal path considerable impedance charges.

The addition of resistor 39 which is smaller in magnitude than resistor 40 serves to provide current feedback for the chrominance amplifier and serves to effectively isolate capacitor 41 from reflecting back its capacitive reactance to the base electrode of the transistor amplifier 35 which reactance might otherwise upset the operation of the emitter follower 25 as terminating the video detector.

The luminance amplifier transistor 36 is also arranged in a common emitter amplifier configuration and has a collector load comprising resistor 42 coupled between the collector electrode of transistor 36 and a point of reference potential.

Resistor 36 is selected to terminate the delay line 100 while further serving to permit voltage gain to be provided for the luminance channel. An emitter bias is provided for transistor 36 via resistor 43 coupled between the emitter electrode and $+V_{cc}$ supply. Resistor 43 is bypassed for high frequency operation by capacitor 44. The collector electrode of the transistor 36 is direct coupled to the subsequent delay line 100, and subsequent luminance amplifiers, forming the luminance channel of a typical color television receiver.

In summation, the above-described low level video circuitry has the following advantages.

The emitter follower 25 serves to effectively isolate the video detector and associated filter networks from the luminance and chrominance stages. Such stages are further isolated from each other by means of their own common emitter amplifiers represented in part by transistors 35 and 36. As is known, certain controls for providing optimum display are provided for in the luminance amplifier channel which conventionally includes a brightness and a contrast control. By so isolating the luminance channel as described above these controls do not affect the operating conditions of the chrominance channel.

In a similar manner, the chrominance channel is designed to provide color hue and color saturation controls, while further being disabled during the burst period by means of the horizontal blanking pulse provided thereto. In this manner, one may operate on the chrominance channel controls without reflecting any spurious signals back to the video detector or luminance amplifier and therefore prevent interference with the normal operation of the luminance channel because of the subsequent isolation provided by the chrominance amplifier including transistor 35.

Another advantageous feature of the amplifier configuration thus described is the isolation of the luminance channel amplifiers and associated controls from the sync, AGC and noise cancelling circuitry. From the figure it can be seen that such circuits normally found in a conventional receiver are driven from the emitter of transistor 36 which provides a low impedance drive source for these circuits. The capacitor 44, as coupled in shunt with the emitter load of transistor 36, further serves to peak the collector signal for the drive applied to the base electrode and aids in limiting noise pulses which would interfere with the operation of the sync and AGC circuits coupled to the emitter electrode. The emitter electrode of transistor 36 is directly coupled to the base electrode of an AGC transistor 50 via a resistor 51. The AGC transistor 50 is an NPN device and has its emitter electrode coupled to a point on a voltage divider via a resistor 52. The voltage divider comprises the series combination of resistors 53, 54, and 55 coupled between the $+V_R$ or aforementioned reference voltage supply, and the point of reference potential. The reason for doing this will be described in greater detail subsequently.

The emitter electrode of transistor 50 is therefore coupled between the junction between resistors 53 and 54, included in the above-mentioned divider by means of resistor 52. In a similar manner, a sync separator preamplifier transistor 56 has the base electrode thereof coupled between the junction of resistors 54 and 55 included in the above-mentioned divider. The electrode of the sync preamplifier transistor 56 is coupled to the emitter electrode of the transistor 36 via resistor 58. The sync preamplifier stage is arranged in a common base configuration and has the collector electrode coupled to a point of reference potential via a resistor 60 which is bypassed for frequency compensation by means of a capacitor 61. Capacitor 61 lowers the bandpass of the amplifier 58 for noise and chrominance signals which would otherwise interfere with the sync separation process. The collector electrode output of transistor 56 is AC coupled via a capacitor 62 in series with a resistor 63 to the base electrode of a sync separator transistor amplifier 65. Transistor 65 is arranged in a common emitter configuration and has a collector load coupled to the vertical and horizontal deflection circuits shown generally as module 66. Also direct coupled to the emitter electrode of the luminance driver amplifier transistor 36 is the emitter electrode of a transistor 70 used as a noise canceller and arranged in a common base configuration. Transistor 70 also has its base electrode biased from the $+V_R$ supply by means of resistor 71. The collector electrode of transistor 70 is coupled to the base electrode of the sync separator transistor by means of a resistor 72.

Before explaining the mode of operation of the above-described circuitry, a few brief points will be noted. Namely it is noted that the video detector including the emitter follower comprising in part transistor 25 are referenced from the $+V_R$ reference supply. The sync preamplifier including transistor 56, the noise canceller including transistor 70, and the AGC keyer including transistor 50 are all DC coupled to the output electrode or emitter electrode of luminance amplifier transistor 36; which in turn is DC coupled to the emitter electrode of the emitter follower including transistor 25.

In a similar manner, the base electrode of all the above-noted transistors are referenced from the $+V_R$ supply or the above-noted reference voltage supply. The AGC transistor 50 is an NPN because of the AGC voltage polarity to be used to control the gain of the RF and IF amplifiers. A positive keying pulse is typically available at the horizontal deflection transformer and an NPN-transistor as shown, when keyed by a positive pulse will provide a negative DC level across a suitable capacitor for AGC voltage. This is also preferable as the keying pulse which is normally applied to the collector electrode is of a relatively large amplitude and due to present commercial practices it is more economical to purchase an NPN-transistor capable of handling the relatively large keying pulse which is applied thereto from the horizontal deflection circuits 66 of the receiver. Thus an NPN-transistor 50 is used for the AGC circuit. Consideration is now given to the transistor types to be utilized for the relatively low level video stages and chrominance stages together with the signal processing circuitry included. It is noted that transistors 25, 35, 36, 70 and 56 are all PNP devices which are selected to be the same transistor type. The inclusion of the five transistor in the low-level video processing portion of the receiver allows the manufacturer to purchase relatively large numbers of these inexpensive PNP devices while obtaining optimum performance in the receiver by utilizing the shown circuit configuration, described briefly above and which will be described in greater detail subsequently.

In circuit operation, from a DC point of view, the emitter electrode of the AGC transistor 50 is approximately biased at 0.8 of a volt or 1 $V_{BE}$ below the reference voltage $+V_R$. The biasing of the video detector from the $+V_R$ voltage source via resistors 31 and 32 causes the voltage at the emitter electrode of transistor 25 to be approximately 1 $V_{BE}$ above the voltage on the base electrode of transistor 25. The voltage at the emitter electrode of transistor 36 is again 1 $V_{BE}$ above the voltage at the emitter electrode of transistor 25, or $2V_{BE}$ above the voltage at the base electrode of transistor 25. Due to the fact that the AGC transistor 50 is an NPN device, the voltage from base to emitter is 1 $V_{BE}$ in the opposite direction from PNP device.

The emitter electrode of transistor 50, as indicated, is approximately 1 $V_{BE}$ below the $+V_R$ supply or 0.8 volts (for NPN) below the $+V_R$ supply. The AGC transistor 50 as biased should conduct when keyed by the pulse coupled to the collector, during the sync tip portion of the composite signal. Hence, the difference between the DC voltage at the base electrode of transistor 25 with respect to the DC conduction point of transistor 50 determines the peak-to-peak video swing at the video detector. This level is accurately set forth and is determined by the magnitude of the $+V_R$ supply and the reference voltage dividers, together with the $V_{BE}$ drops of the associated transistors.

Transistor 70, as biased, will conduct during noise pulses which are approximately 0.8 volts above the sync tip level. The conduction of transistor 70 causes the collector electrode to go more positive thus attempting to cutoff transistor 56 or decrease the conduction to thereby effectively cancel the noise pulse at the collector electrode thereof. This action serves to render the sync circuits relatively noise immune as noise pulses are cancelled due to the conduction and biasing of transistor 70.

The noise canceller, thus shown, is completely DC coupled to the sync amplifier transistor 56 and to the video amplifier transistor 36 thus requiring no coupling capacitors or additional diode devices as normally found in the prior art. Resistor 71 in series with base is effectively divided by the beta of transistor 70 and introduces a low impedance seen at the emitter electrode of transistor 36 when transistor 70 conducts. Thus when transistor 70 conducts the resistor 71 as transformed loads the noise pulses above sync tip as applied to the AGC transistor 50.

Capacitor 80 in shunt with resistor 55 at the base electrode of transistor 56 serves to bypass the base for common base operation.

The sync preamplifier transistor 56 as biased is active during the entire video signal as the emitter electrode is more positive than the base electrode due to the biasing thereof from the $+V_R$ supply. Sync separation is performed by transistor 65 which is normally conducting due to resistor 90 coupled between the $+V_R$ supply L and the base electrode. When horizontal sync appears at the base via capacitor 62 which is selected to be relatively large this serves to cause increased conduction in transistor 65 thus producing a negative sync pulse at the collector. During the video portion, transistor 65 is driven towards cutoff. A similar operation occurs for the vertical pulses.

The base electrode of the PNP noise canceller transistor 70 is slightly more positive than the emitter electrode of the NPN, AGC transistor 50. Transistor 70 will therefore conduct slightly above the point of conduction of the AGC transistor 50 and therefore, slightly above the DC level representative of sync tip. Since the AGC transistor 50 can conduct during the keying pulse which is developed during the horizontal, a horizontal pulse would appear at the base of the sync amplifier transistor 56 thus disturbing the operation.

If capacitor 80 were too large in magnitude, it would also serve to bypass noise pulses and hence the magnitude of capacitor 80 is selected to provide a compromise to bypass the relatively narrower horizontal pulses without deteriorating the noise cancelling pulses. To further aid in noise cancellation, transistor amplifier 70 provides voltage gain for the noise pulses by proper selection of resistor 72 in relation to impedance seen looking into the junction between resistors 54 and 55.

Thus, the noise canceller being completely DC coupled can also provide gain without signal inversion.

The biasing of the noise canceller from the reference source $+V_R$ assures conduction for noise pulses above sync tip due to the biasing of the video detector and subsequent amplifier configurations from the common reference supply $+V_R$ as described above.

Video processing circuitry, as described, performed accordingly, in an embodiment, which included the following components, by way of example:

| | | |
|---|---|---|
| Resistors | 26 | 2,200 ohms |
| | 30 | 5,600 ohms |
| | 31 | 2,700 ohms |
| | 32 | 10,000 ohms |
| | 34 | 1,000 ohms |
| | 37 | 680 ohms |
| | 38 | 4,700 ohms |
| | 39 | 33 ohms |
| | 40 | 33,000 ohms |
| | 42 | 680 ohms |
| | 48 | 270 ohms |
| | 51 | 1,000 ohms |
| | 52 | 100 ohms |
| | 53 | 560 ohms |
| | 43 | 270 ohms |
| | 54 | 1,000 ohms |
| | 55 | 10,000 ohms |
| | 58 | 330 ohms |
| | 63 | 1,800 ohms |
| | 71 | 1,000 ohms |

| | | | | |
|---|---|---|---|---|
| | 72 | | 1,500 | ohms |
| Capacitors | 41 | | 1,000 | micromicrofarads |
| | 44 | | 1,000 | micromicrofarads |
| | 61 | | 470 | micromicrofarads |
| | 62 | | 0.22 | microfarads |
| | 80 | | 0.047 | microfarads |
| Transistors | 50 | | NPN | 2N3440 |
| | 65 | | NPN | 2N3565 |
| | 25 | PNP | | |
| | 35 | | PNP | |
| | 36 | | PNP | 2N4248 or equivalents |
| | 56 | | PNP | |
| | 70 | | PNP | |
| | $+V_R$ | +18 volts | | |
| | $+V_c$ | +130 volts | | |
| | $+V_{cc}$ | +22 volts | | |

What is claimed is:

1. In a television receiver having a source of composite signals, including image brightness signal components and chrominance components indicative of the color content of a transmitted television scene said chrominance components having signal frequencies in the higher frequency range of said composite signal, in combination therewith apparatus for providing chrominance signal amplification comprising, a. a transistor having base, collector and emitter electrodes, b. means coupling said base electrode to said source of composite signals, c. a first resistor coupled to said collector electrode, said resistor having a first predetermined magnitude for providing a collector load for said transistor, d. a second resistor coupled to said emitter electrode and selected of a magnitude greater than said magnitude of said first resistor, whereby any operating potential applied between said collector and emitter electrodes is primarily developed across said second resistor, as are the lower frequency image brightness components, and e. means coupled to said emitter electrode selected in accordance with said second resistor to bypass said second resistor for said chrominance frequency signal components, whereby amplified chrominance signal components of substantially greater magnitudes than said lower frequency image brightness components, are provided at said collector electrode.

2. In a television receiver having a source of composite signals including image brightness signal components, regularly recurring synchronizing signal components and chrominance components indicative of the color content of a transmitted television scene, in combination therewith, apparatus for providing low-level composite signal amplification comprising, a. a first transistor amplifier arranged in a common collector configuration and having a base electrode circuit coupled to said source of composite signals, b. a second transistor amplifier arranged in a common emitter configuration and having a base electrode directly coupled to the output emitter electrode of said first transistor amplifier, c. a delay line having a given characteristic impedance, d. a first resistor of a value substantially equal to said characteristic impedance of said delay line coupled between the collector electrode of said second transistor and a point of operating potential, said collector electrode being direct coupled to said delay line for terminating the same, e. means including a resistor coupled between a point of operating potential and the emitter electrode of said second transistor for providing frequency compensation to said second transistor amplifier for said image brightness signal components, while further providing a low impedance drive source for said regularly recurring synchronizing components, f. a third transistor amplifier arranged in a common emitter configuration and having a base electrode directly coupled to the output emitter electrode of said first transistor, g. a second resistor of a predetermined magnitude coupled between the collector electrode of said third transistor and a point of operating potential, h. a third resistor of a magnitude larger than said second resistor coupled to the emitter electrode of said third transistor and a point of operating potential whereby said operating potential is primarily developed across said fixed resistor, as are lower frequency image brightness components, and i. means coupled to said emitter electrode of said third transistor operative to bypass said third resistor for said chrominance signal components, whereby amplified chrominance signal components are provided at the collector electrode of said third transistor, while said image brightness components thereat are reduced in amplitude in relation to said chrominance signal components by a factor approaching the ratio of said second and third resistors.

3. The apparatus according to claim 1 wherein the ratio of said second to said first resistor is greater than four to one.

4. In a color television receiver employing RF and IF amplifiers for responding to a transmitted television carrier signal and providing an IF signal output therefrom, said receiver including a video detector having an input coupled to an output of said IF amplifier for providing at an output thereof a composite video signal, said receiver including a luminance channel and a chrominance channel for respectively driving a color kinescope included in said receiver for providing a color display, in combination therewith, apparatus for providing low-level video signal processing, comprising, a. a first transistor of a given conductivity type arranged in an emitter follower configuration and having the base electrode thereof direct coupled to said output of said video detector, b. a source of operating potential having a relatively constant DC amplitude, c. means for coupling said source of operating potential to said base electrode of said first transistor to provide a DC operating potential thereto, d. second and third transistors of the same given conductivity types as said first transistor, each arranged in a common emitter configuration and having the base electrodes thereof direct coupled to the emitter electrode of said first transistor, e. means including a load resistor coupling the collector electrode of said second transistor to said chrominance channel, f. means coupling the collector electrode of said third transistor to said luminance channel, and g. means including a resistor of a magnitude substantially large compared with said load resistor coupling the emitter electrode of said second transistor to a point of operating potential, whereby said operating potential is primarily developed across said resistor as are the lower signal frequency components of said composite signals, said means further including a capacitor for bypassing said resistor for higher signal frequencies, whereby a substantial increase in gain to said higher signal frequencies for said chrominance channel as compared to the amplitude of said lower frequency signals applied thereto is provided.

5. In a television receiver having a source of composite signals including image brightness signal components, regularly recurring synchronizing components and chrominance components indicative of the color content of a transmitted television scene, in combination therewith, apparatus for providing low level composite signal processing, comprising, a. a first transistor arranged in an emitter follower configuration and having a base electrode input direct coupled to said composite signal source, b. second and third transistors each having base, emitter and collector electrodes, c. a first resistor coupling the base electrode of said second transistor to said emitter output electrode of said emitter follower, d. a second resistor coupling the base electrode of said third transistor to said emitter output electrode of said emitter follower, e. first means coupled to the emitter electrode of said second transistor responsive to said regularly recurring synchronizing components for separating the same from said composite signal, f. second means coupled to said collector electrode of said second transistor for providing an amplified version of said image brightness signal components, whereby said second transistor including said first resistor isolates said synchronizing and image brightness components from said first and third transistors, g. third means including a load resistor coupled to said collector electrode of said third transistor responsive to said chrominance components of said composite signal, h. a third resistor of a magnitude greater than said load resistor coupled to said emitter electrode of said third transistor for providing the substantial DC load for said transistor whereby any operating potential applied to said third transistor is primarily developed across said third resistor, including low frequency signal components of said composite signal, and i. means coupled to said emitter electrode of said third transistor selected in accordance with said magnitude of said third resistor for bypassing said resistor for said chrominance components of said composite signal, whereby amplification of said chrominance signals, attenuating said image brightness components in proportion to the ratio of said third resistor and said load resistor, is provided at said collector electrode.

6. The apparatus according to claim 5 wherein said first, second and third transistors are all of the same conductivity type.

7. The apparatus according to claim 5 wherein said means coupled to said emitter electrode of said third transistor is a capacitor having a reactance at said chrominance frequencies substantially smaller than the magnitude of said third resistor.

8. The apparatus according to claim 7 further including, a. a degenerating resistor coupled between said emitter electrode of said third transistor and the junction of said capacitor and said third resistor for isolating said capacitor from said base input electrode of said third transistor to cause said emitter follower to be terminated in a resistive load substantially equal to said second resistor and the resistive component of the input impedance of said third transistor.

* * * * *

UNITED STATES PATENT OFFICE
CERTIFICATE OF CORRECTION

Patent No. 3,624,280 Dated November 30, 1971

Inventor(s) George E. Anderson

It is certified that error appears in the above-identified patent and that said Letters Patent are hereby corrected as shown below:

Column 4, line 61, that portion reading "The electrode" should read -- The emitter electrode --.
Column 7, lines 8 to 12, a brace should be inserted as follows:

| | | |
|---|---|---|
| 25 | PNP | 2N4248 or equivalents |
| 35 | PNP | |
| 36 | PNP | |
| 56 | PNP | |
| 70 | PNP | |

Signed and sealed this 11th day of July 1972.

(SEAL)
Attest:

EDWARD M.FLETCHER,JR.
Attesting Officer

ROBERT GOTTSCHALK
Commissioner of Patents